United States Patent [19]

Takanashi et al.

[11] Patent Number: 4,980,591
[45] Date of Patent: Dec. 25, 1990

[54] ONE-WAY CLUTCH FOR A REDUCTION-GEARED MOTOR

[75] Inventors: Yoshiharu Takanashi, Kosai; Yuji Masuda, Shizuoka, both of Japan

[73] Assignee: Asmo Co., Ltd., Kosai, Japan

[21] Appl. No.: 431,092

[22] Filed: Nov. 3, 1989

[30] Foreign Application Priority Data

Dec. 20, 1988 [JP] Japan .................................. 63-320895

[51] Int. Cl.$^5$ ......................... H02K 7/108; F16D 7/04
[52] U.S. Cl. ........................................ 310/83; 74/425; 192/1.37; 192/8 R; 310/78
[58] Field of Search ........................ 49/349, 352, 362; 74/425, 625, 89.14; 188/82.1; 192/7, 8 R, 1.2 D, 1.36, 1.37; 310/77, 78, 80, 83; 464/39

[56] References Cited

U.S. PATENT DOCUMENTS

| | | | |
|---|---|---|---|
| 3,562,565 | 2/1971 | Higashino | 310/77 |
| 4,430,592 | 2/1984 | Manktelow | 310/77 |
| 4,510,405 | 4/1985 | Carroll et al. | 310/78 |
| 4,534,233 | 8/1985 | Hamaguchi | 49/352 |
| 4,643,040 | 2/1987 | Adam et al. | 49/349 |
| 4,652,781 | 3/1987 | Andrei-Alexandru et al. | 74/425 |

FOREIGN PATENT DOCUMENTS 3438254 4/1986 Fed. Rep. of Germany ........ 49/349

*Primary Examiner*—Steven L. Stephan
*Assistant Examiner*—D. L. Rebsch
*Attorney, Agent, or Firm*—Burns, Doane, Swecker & Mathis

[57] ABSTRACT

A one-way clutch for a reduction-geared motor having a reversible electric motor and reduction gears allows an output shaft thereof to rotate in a normal direction and firmly prevents the output shaft from rotating in a reverse direction when the reversible electric motor is not fed. The one-way clutch includes a transmission gear supported on the output shaft wherein a sawtooth is provided on one side of the transmission gear. A clutch, axially movable relative to the output shaft, has a sawtooth facing the sawtooth of the transmission gear. The clutch also provides a radially located rotation-prevention portion. A compression spring is included for urging the clutch for the transmission gear in a direction along the axis of the output shaft. A stopper pin in the gear casing is inserted into the rotation prevention portion of the clutch. An electromagnet in the gear casing urges the clutch in a direction opposite to the direction urged by the compression spring when the electromagnet is fed. The clutch permits fail-safe closing of a power window, sunroof, etc.

4 Claims, 5 Drawing Sheets

ONE-WAY CLUTCH FOR A REDUCTION-GEARED MOTOR

BACKGROUND OF THE INVENTION

The present invention relates to a one-way clutch for a reduction-geared motor which drives an anchor of a passive seat belt, a power window, a sunroof for an automotive vehicle and so on.

For example, the anchor, the power window, and the sunroof moves under the effect of an external force during stopping of the reduction-geared motor, which is undesirable for the reduction-geared motor with a view to securing passenger's safety and preventing crime. Therefore, a worm gear has been used as reduction means in order to prevent the driving motor from being rotated by the external force acting on driven articles, that is, in order to prevent a reverse driving when the motor is stopped.

However, a lead angle at a pitch point must be narrowed so that the worm gear can perform the function of preventing the reverse driving. If the lead angle at the pitch point is adapted to be narrow, a large loss is generated by sliding between tooth surfaces at a meshing portion thereof, which causes a tendency for a low rotation transmission efficiency. Further, pressure gets high between the tooth surfaces, and a worm wheel of the worm gear often was damaged when the driven articles were shocked suddenly, for example, when the seat belt was shocked suddenly in emergency.

Lately, a demand for a large passenger compartment causes pillar, door and ceiling of the vehicle to be limited in thickness and requires the reduction-geared motor disposed therein to be small and thin. In order to make the reduction-geared motor small and thin, using a worm gear having a wide lead angle at the pitch point, or gears other than the worm gear, such as a spur gear and a bevel gear, the rotation transmission efficiency should preferably be heightened. However, these gears have no function of preventing reverse driving. This made it necessary for the above gears to have a locking mechanism outside the reduction-geared motor so as to prevent reverse driving. Referring to FIG. 6, there is shown the reduction-geared motor for driving the anchor of the passive seat belt as an example of a conventional reduction-geared motor.

An output shaft 2 which drives the anchor (64 in FIG. 4) is supported in a gear casing 8. A cover 12 of the casing 8 is screwed on a casing body 10. A worm wheel 6 meshes with a worm 4 formed in a shaft of an electric motor 3. The worm 4 widens the lead angle at the pitch point in order to heighten the rotation transmission efficiency. The worm 4 can be driven reversely by about 45 kg.cm of rotary driving force on the worm wheel 6 side. The worm wheel 6 is supported in the output shaft 2. A rubber plate 34 is secured between a first disc 32 and a second disc 35 to form a cushion rubber member 30. A projection 40 is formed in the first disc 32 and engages with an engagement hole 31 provided in the worm wheel 6. A substantially-oval hole 44 is made in the center of the second disc 35. The diameter of the output shaft 2 is reduced in two stages in a lower portion of the shaft for supporting the worm wheel 6. A first reduced-diameter portion 18 has a parallel-cut portion 20 with a substantially-oval section and an annular groove 22 beneath the parallel-cut portion 20. The hole 44 of the second disc 35 engages the first reduced-diameter portion 18 and a snap ring 46 causes the second disc 35 not to move in an axial direction.

Consequently, a rotary driving force of the electric motor 3 is transmitted to the output shaft 2 via the worm 4, the worm wheel 6 and the cushion rubber member 30.

While a seat belt is fastened to a passenger, the locking mechanism (not illustrated) provided outside the reduction-geared motor fixes the anchor of the seat belt and burdens the sudden shock in emergency.

The conventional reduction-geared motor requires the locking mechanism to be provided in the outside thereof in order to secure passenger's safety and prevent crime. Locating the locking mechanism outside the motor, however, is disadvantageous because the passenger compartment gets small.

Meanwhile, the manual operation requires the locking mechanism to be disengaged once. If the locking mechanism cannot be disengaged, for example, when the locking mechanism breaks down, there was a further disadvantage in that manual operation cannot be performed.

SUMMARY OF THE INVENTION

An object of the invention is to provide a one-way clutch for a reduction-geared motor which can prevent reverse driving from an output shaft side without providing a locking mechanism on the outside thereof.

Another object of the invention is to provide a reduction-geared motor having a fail safe function which allows manual operation.

A further object of the invention is to provide a reduction-geared motor which can facilitate manual operation without disengaging the locking mechanism.

Another further object of the invention is to provide a reduction-geared motor which is so small.

In accordance with the invention, these and other objects are achieved by a reduction-geared motor comprising:

an electric motor, a gear casing provided with the electric motor, an output shaft rotatably supported in the casing, and gear reduction means transmitting a rotary driving force of the electric motor to the output shaft, said reduction-geared motor further comprising:

the gear reduction means including transmission gear means having sawtooth means provided on the side thereof clutch means inserted in a rotatable and axially movable manner relative to the output shaft and having sawtooth means facing the sawtooth means of the transmission gear means, energizing means which energizes the clutch means for the transmission gear means in an axial direction of the output shaft, rotation prevention means fixedly provided in the gear casing and inserted into the clutch means and preventing the rotation of the clutch means relative to the gear casing, and electromagnetic attraction means attract the clutch means in a direction opposite to the direction urged by the energizing means, wherein the transmission gear means is rotatable in a normal direction and is prevented from rotating in a reverse direction by engagement between the sawtooth means of the transmission gear means and the clutch means when the electromagnetic attraction means is not fed, and the transmission gear means is rotatable in normal and reverse directions when the electromagnetic attraction means is fed.

The reverse driving is needed only in a predetermined direction for the manual operation of the anchor of a passive seat belt, the power window, and the sunroof for the automotive vehicle. That is, it is necessary that the passive seat belt can be fastened to a passenger by manual operation in order to secure passenger safety. Also, it is necessary that the power window and the sunroof can be closed from the open state thereof by manual operation so as to prevent crime.

In the reduction-geared motor constructed as above, the clutch operation for a single direction is produced by the sawtooth means of the transmission gear means and the sawtooth means of the clutch means which is prevented from rotating and energized by the energizing means, so that the transmission gear means is adapted to rotate in the single direction and not to rotate in the other direction in the case of the manual operation.

In the case of driving by the electric motor, the electromagnetic attraction means overcomes the energizing means to attract the clutch means so that the transmission gear means can rotate in both directions.

other and further objects, features and advantages of the invention will become appear more fully from the following description.

DETAILED DESCRIPTION OF THE PREFERRED EMBODIMENTS

Figure 1:
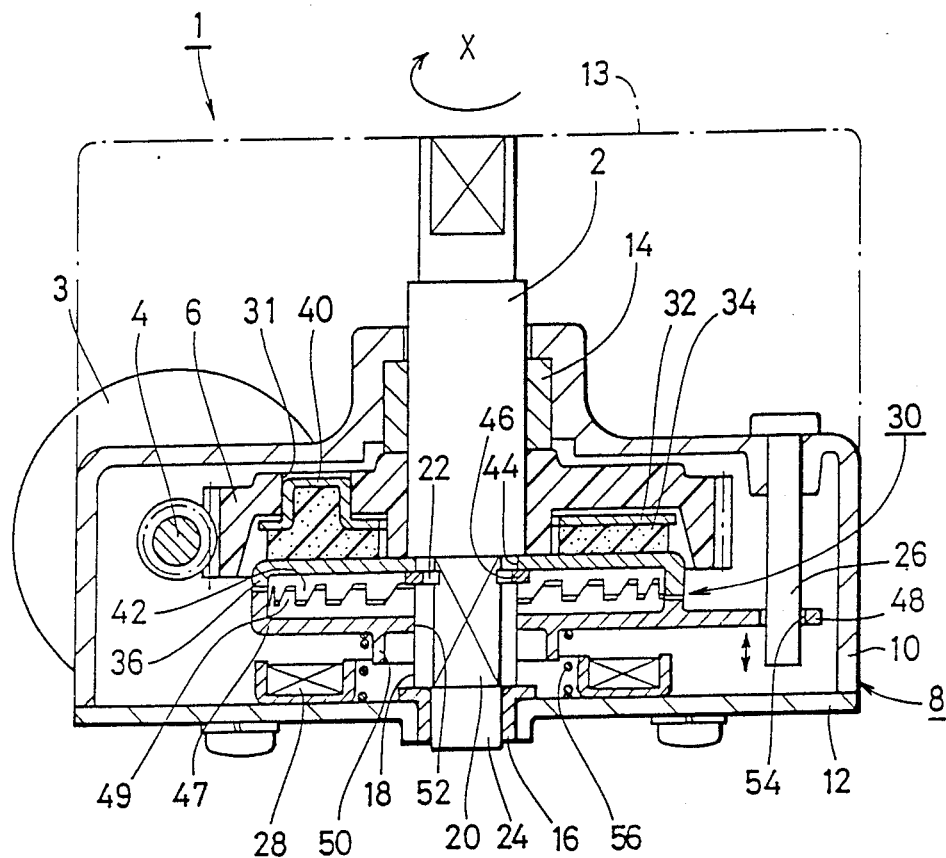
FIG. 1 is a sectional view illustrating an embodiment of a reduction-geared motor of the present invention.

Referring now to the drawings, there is shown an embodiment of the present embodiment.

Figure 2:
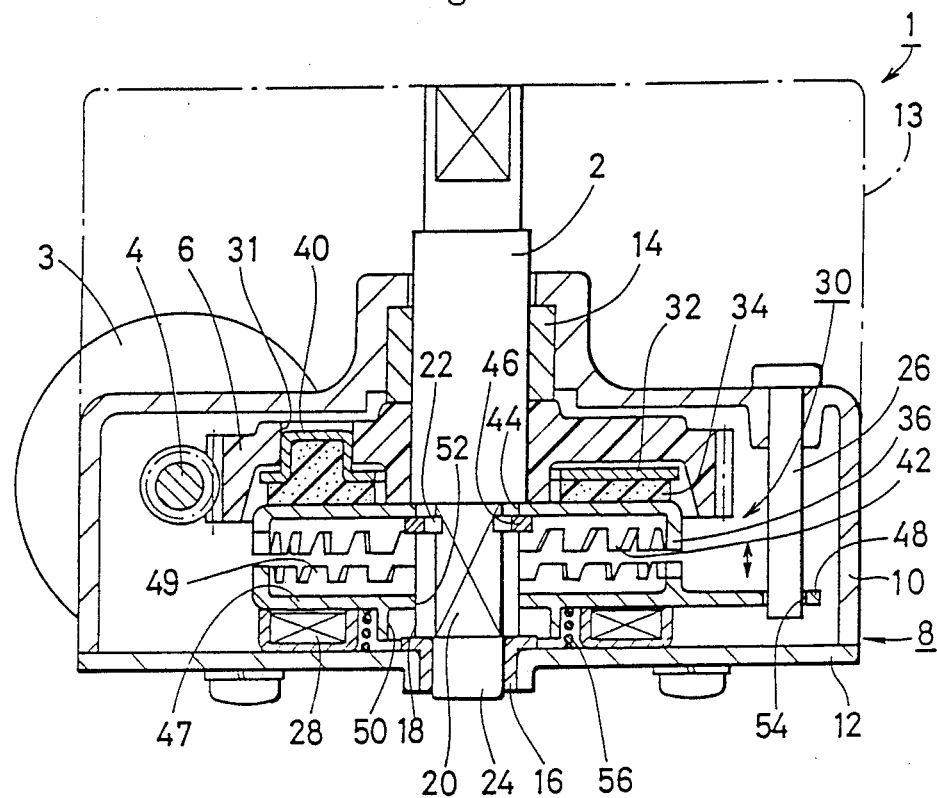
FIG. 2 is a sectional view illustrating the condition that an electromagnet coil is fed in the above embodiment.
Figure 4:
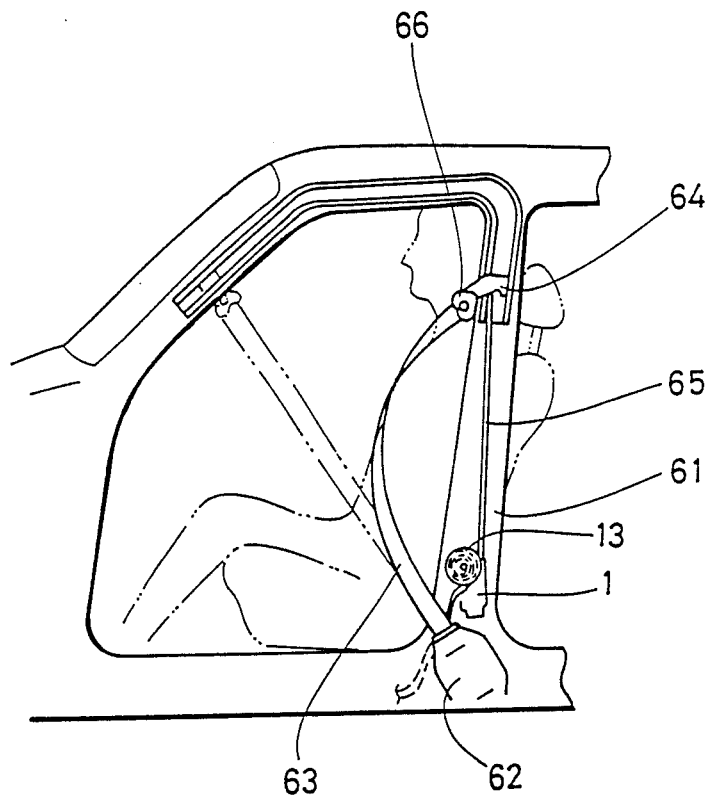
FIG. 4 is a side view of a passive seat belt device in which the reduction-geared motor of the present invention is used.

FIGS. 1 and 2 illustrate a reduction-geared motor for driving an anchor of a vehicle passive seat belt. For example, as illustrated in FIG. 4, the reduction-geared motor 1 is disposed in a lower portion of a center pillar 61 within a passenger compartment. A seat belt 63 is pulled at both ends thereof by the reduction-geared motor 1 and a seat belt retractor 62 installed substantially in the middle of a car breadth. The seat belt retractor 62 is a known emergency locking retractor, which prevents a sudden unwinding of the seat belt 63 only in emergency. In normal case, the seatbelt retractor 62 winds the seat belt 63 by the use of an energizing force of a built-in spiral spring.

An output shaft 2 illustrated in FIG. 1 drives an anchor 64 of the passive seat belt illustrated in FIG. 4 via a winding part 13 and a wire cable 65 by a rotary driving force transmitted to a worm wheel 6 by transmission gear means from a worm 4 driven by an electric motor 3. The worm 4 is so formed as to widen lead angle at a pitch point and has no function of preventing a reverse driving, and performs the reverse driving when the rotary driving force reaches approximately 45 kg.cm. The output shaft 2 is made of ferruginous metal and supported in a gear casing 8 which comprises a casing body 10 and a cover 12. An end of the output shaft 2 projects from the casing body 10 so as to rotate the winding part 13 for the wire cable 65 connected to the anchor 64 illustrated in FIG. 4. The output shaft 2 is inserted into a bearing 14 secured to the casing body 10, and the diameter of the output shaft 2 is reduced into two stages. A first reduced-diameter portion 18 is provided with a parallel-cut part 20 forming a substantially-oval section and with an annular groove 22. A second reduced-diameter portion 24 is inserted into a bearing 16 secured to the cover 12. When the output shaft 2 rotates in a direction shown by an arrow X, namely, clockwise, the output shaft 2 drives the anchor 64 in a direction in which the seat belt 63 is wound, fastening the seat belt 63 to a passenger. Meanwhile, when the output shaft 2 rotates counterclockwise, the output shaft 2 unwinds the seat belt 6, unfastening the seat belt 63 from the passenger. The output shaft 2 can be driven by the electric motor 3 and also can be operated by manual operation means (not illustrated) only in the direction shown by the arrow X because of a clutch operation for a single direction, as will be described below.

The casing body 10 is made of aluminum die casting and the like. A stopper pin 26 is secured to the casing body 10. The stopper pin 26 is made of ferruginous metal and is face-hardened by means of carburization in order to give satisfactory wear-resistance.

The cover 12 is in the form of a plate except for a part securing the bearing 16 and is screwed on the casing body 10. An annular electromagnet coil 28 is secured inside the cover 12.

The worm wheel 6 which engages with the worm 4 is made of a formed resin and supported in the output shaft 2. A rotary driving force is transmitted to the worm wheel 6 via a cushion rubber member 30. At least one engagement hole 31 is made in the worm wheel 6.

A first disc 32, a rubber plate 34 and a second disc 36 are secured to form the cushion rubber member 30. The first disc 32 is provided with a projection 40 engaging with the engagement hole 31 of the worm wheel 6. The rubber plate 34 is provided in order to relieve shock produced in a rotary direction. The second disc 36 has a peripheral end which is bent downwardly for the cover 12, in which sawtooth means 42 is formed throughout the entire periphery. Substantially-oval holes 44 are made in the center of the second disc 36. The second disc 36 engages the first reduced-diameter portion 18 of the output shaft 2 having substantially-oval sections and is secured to the output shaft 2 by insertion of a snap ring 46 into the annular groove 22. Thus, the worm wheel 6 is coupled with the output shaft 2 via the cushion rubber member 30, so that a rotary driving force is transmitted to the output shaft 2 via the worm 4, the worm wheel 6, and the cushion rubber member 30. The second disc 36 has a plurality of the sawtooth means 42 having an incline portion 42a and a vertical portion 42b. The sawtooth means 42 may be formed in a unitory member.

A clutch member 47 has such an external shape as to add a rotation-prevention portion 48 and a spring holding portion 50 to the second disc 36. A circular hole 52 is made in the center of the clutch member 47. An outside diameter of the spring holding portion 50 is formed a little smaller than an inside diameter of a compression spring 56. The clutch member 47 can move in an axial direction relative to the first reduced-diameter portion 18 of the output shaft 2, but cannot rotate relative to the casing body 10 because the stopper pin 26 is inserted into a hole 54 provided in the rotation-prevention portion 48 thereof. The clutch member 47 has a plurality of sawtooth means 49 having an incline portion 49a and a vertical portion 49b. The sawtooth means 49 may be formed in a unitory member. An outside diameter of the compression spring 56 is formed a little smaller than an inside diameter of the electromagnet coil 28. The compression spring 56 energizes the clutch member 47 toward the second disc 36.

The electromagnet coil 28 is so controlled as to be fed by control means (not illustrated) only when the electric motor 3 is in operation. While the electric motor 3 is in operation, the electromagnet coil 28 is excited, attracting the clutch member 47, as illustrated in FIG. 2. while the electric motor 3 is not in operation, the control means stops feeding and exciting the electromagnet coil 28. As a result, as illustrated in FIG. 1, an energizing force of the compression spring 56 makes the clutch member 47 strike the second disc 36 and also makes the sawtooth means 42 and 49 engage each other.

(ACTUATION)

Actuation of the reduction-geared motor as constructed above is explained.

When the electric reduction-geared motor 1 drives the anchor 64 in order to unfasten a seat belt from a passenger or fasten a seat belt to a passenger, the electromagnet coil 28 is fed and attracts the clutch member 47. Thus, the electric motor 3 transmits a rotary driving force to the output shaft 2 via the worm 4, the worm wheel 6, and the cushion rubber member 30, so that the output shaft 2 can rotate in normal and reverse directions.

When the electric motor 3 stops operation, and feeding of the electromagnet coil 28 is stopped, the energizing force of the compression spring 56 makes the clutch member 47 engage with the second disc 36 of the cushion rubber member 30 and also makes the sawtooth means 42 and 49 mesh with each other to produce the clutch connection for the single direction, as illustrated in FIG. 1. Because the clutch member 47 is prevented from rotating by the stopper pin 26 and worm 4 has the wide lead angle at the pitch point so as to enable the reverse driving, the second disc 36, the worm wheel 6 and the output shaft 2 can rotate together in a single direction and the output shaft 2 can rotate only in a direction shown by an arrow X in FIG. 1.

Figure 3:
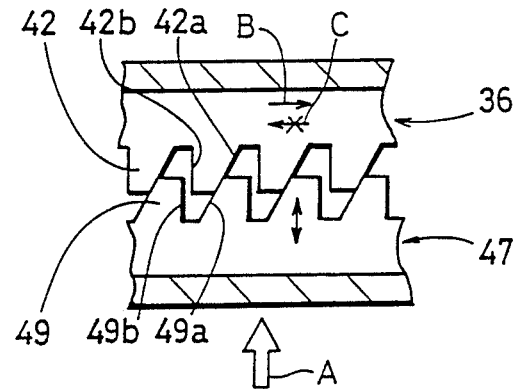
FIG. 3 is a partially enlarged view illustrating a clutch operation in the above embodiment.

The above clutch operation for the single direction is explained, referring to FIG. 3. showing the meshing portion between the sawtooth means 42 of the second disc 36 and the sawtooth means 49 of the clutch member 47.

The clutch member 47 is energized by the compression spring 56 in an upper direction shown by an arrow A. When the second disc 36 is driven reversely by the output shaft in a normal direction shown by an arrow B, contacting and sliding the incline portions 42a and 49a of the sawtooth means 42 and 49, the second disc 36 rotates, pushing down the clutch member 47 in a direction opposed to the arrow A. On the contrary, when the second disc 36 is driven reversely by the output shaft in a direction shown by an arrow C, striking the vertical portions 42b and 49b of the sawtooth means 42 and 49, the second disc 36 thus cannot rotate.

Consequently, even when the electric motor 3 stops operation thereof and the electromagnet coil 28 is not fed, the anchor 64 of the seat belt 63 can be driven by the manual operation means (not illustrated) only in a direction in which the seat belt 63 is fastend to a passenger.

Figure 6:
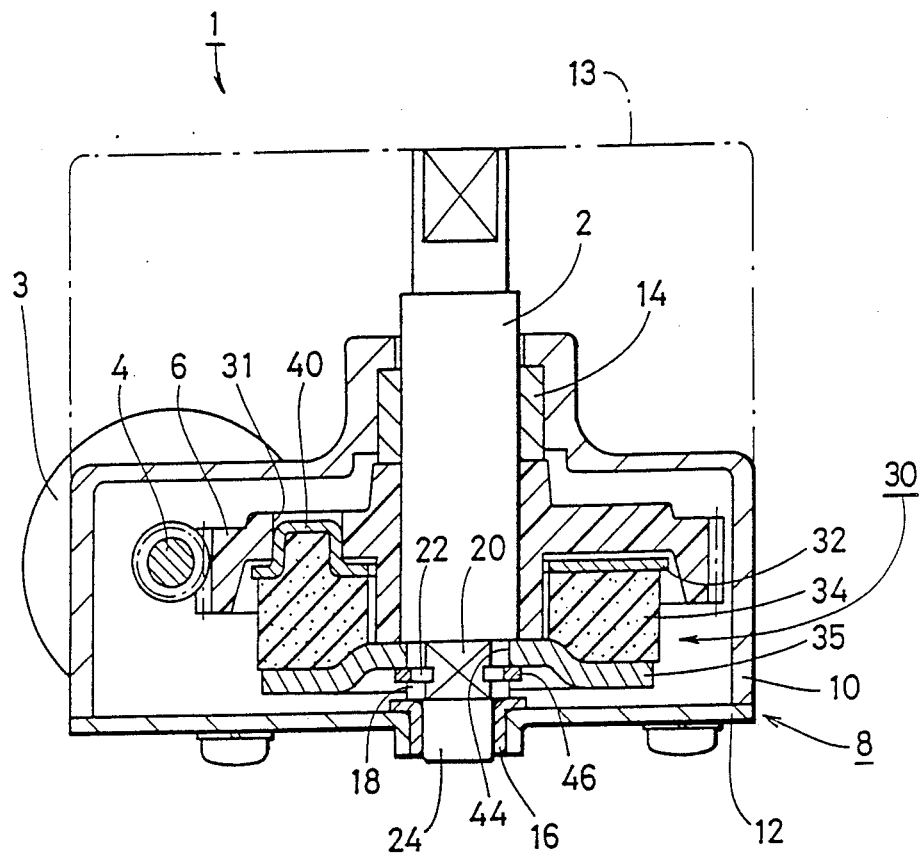
FIG. 6 is a sectional view illustrating a conventional reduction-geared motor.

This enables fastening of the seat belt 63 even if the electric motor 3 is damaged. Meanwhile, the seat belt 63 also can be unfastened by removal of the belt hook 66 from the anchor 64 as illustrated in FIG. 6, even if the electric motor 3 is damaged.

(Other Embodiment)

Figure 5:
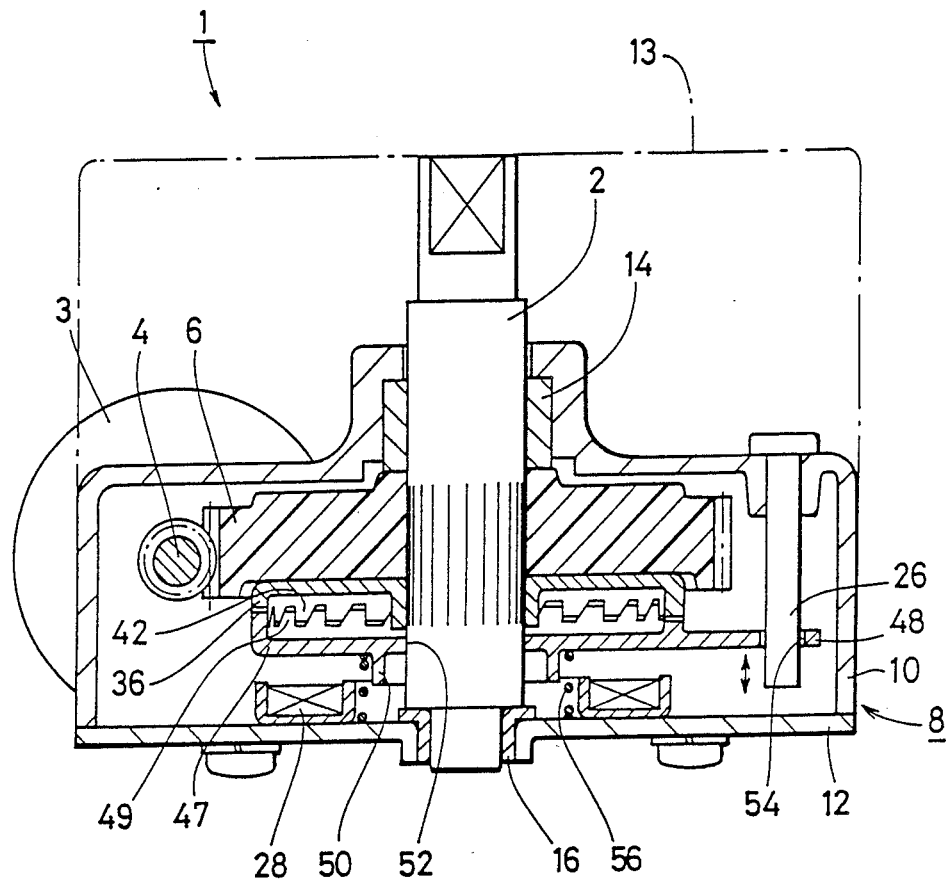
FIG. 5 is a sectional view illustrating another embodiment of the reduction-geared motor of the present invention.

The present invention is not limited to minor details of the above embodiment. For example, as illustrated in FIG. 5, the second disc 36 having the sawtooth means 42 may be forcedly fitted and brazed with the output shafts; further, the worm wheel 6 may be fixed in the output shaft 2.

In the above embodiment, the worm gear which has the wide lead angle at the pitch point so as to be able to perform the reverse driving is used as reduction means, but a spur gear or a bevel gear may be substituted for the worm gear as other reduction means which can perform the reverse driving.

Further, the reduction-geared motor of the present invention can be used to drive a power window, a sunroof and other articles, as well as the anchor of the passive seat belt. If the electric motor stops or breaks down, the reduction-geared motor also can be operated manually only to close the power window and the sunroof. This allows enough prevention of crime in that the power window and the sunroof cannot be opened from outside a passenger compartment.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A one-way clutch for a reduction-geared motor having a reversible electric motor, a gear casing provided with the electric motor, an output shaft rotatably supported in the gear casing, and gear reduction means transmitting a rotary driving force of the electric motor to the output shaft, comprising:

a transmission gear means supported on the output shaft as an element of said gear reduction means, a sawtooth means disposed on one side of the transmission gear means, a clutch means axially movable relative to the output shaft and having sawtooth means facing the sawtooth means of the transmission gear means, said clutch means having a radially oriented rotation-prevention portion, an energizing means which urges the clutch means for the transmission gear means in a direction along the axis of the output shaft, rotation prevention means fixed in the gear casing and inserted into the rotation prevention portion of the clutch means for preventing the rotation of the clutch means relative to the gear casing, and electromagnetic attraction means for attracting the clutch means in a direction opposite to the direction in which the energizing means urges the clutch means, wherein the transmission gear means is rotatable in a normal direction and is prevented from rotating in a reverse direction by engagement between the sawtooth means of the transmission gear means and the sawtooth means of the clutch means when the electromagnetic attraction means and the electric motor are not fed, and the transmission gear means is rotatable in at least one of a normal and reverse direction when the electromagnetic attraction means and the electric motor are fed.

2. A one-way clutch for a reduction-geared motor according to claim 1 wherein the transmission gear means includes a gear member having meshing teeth on an outside circumference thereof and engagement holes on a side thereof and being insertable into the output shaft, a first disc member having projections which project toward the output shaft for the gear member and engage with the engagement holes provided in the gear member, a second disc member having sawtooth means on a side thereof and being fixed in the output shaft, and a rubber member disposed between the first and the second discs and coupling both discs resiliently.

3. A one-way clutch for a reduction-geared motor according to claim 1 wherein the transmission gear means includes a gear member having meshing teeth on an outside circumference thereof and being fixedly provided on the output shaft and a disc member having sawtooth means and being fixedly provided on the output shaft.

4. A one-way clutch for a reduction-geared motor according to either claims 1, 2 or 3 wherein the reduction gear means includes a worm and a worm wheel meshing each other and having a wide lead angle at a pitch point so as to enable a reverse driving of the output shaft when the electric motor and the electromagnetic attraction means are not fed.

* * * * *